United States Patent [19]

Nyce

[11] Patent Number: 5,043,685
[45] Date of Patent: Aug. 27, 1991

[54] THRESHOLD COMPENSATING DETECTOR FOR MAGNETOSTRICTIVE TRANSDUCER

[75] Inventor: David S. Nyce, Raleigh, N.C.

[73] Assignee: MTS Systems Corporation, Eden Prairie, Minn.

[21] Appl. No.: 590,145

[22] Filed: Sep. 28, 1990

[51] Int. Cl.[5] .................. H01P 9/00; H01L 41/00
[52] U.S. Cl. ................................. 333/148; 310/26
[58] Field of Search .................. 310/26; 335/215; 333/148

[56] References Cited

U.S. PATENT DOCUMENTS

| 3,566,239 | 2/1971 | Taniguchi | 318/593 |
| 3,898,555 | 8/1975 | Tellerman | 333/148 |
| 4,344,068 | 8/1982 | Thompson et al. | 340/365 L |
| 4,803,427 | 2/1989 | Mason et al. | 324/207 |

Primary Examiner—Steven L. Stephan
Assistant Examiner—Edward H. To

[57] ABSTRACT

A magnetostrictive linear position transducer including a position indicating magnet. Magnet position information is fed back to the detector to automatically control the detector threshold as a function of magnet position.

5 Claims, 5 Drawing Sheets

THRESHOLD COMPENSATING DETECTOR FOR MAGNETOSTRICTIVE TRANSDUCER

BACKGROUND OF THE INVENTION

1. Field of the Invention

The present invention relates to magnetostrictive transducers or gauges. The magnetostrictive position transducer gauge described herein, incorporates a novel signal reception subsystem, which improves noise performance. This permits the construction of longer gauges, or gauges for use in noisier environments.

The inventive structure includes a threshold detector system which automatically compensates for the position of a location indicating magnet.

The invention is disclosed in the context of a "4–20 ma transmitter standard", magnetostrictive linear position transducer.

2. Description of the Prior Art

In general, magnetostrictive position sensors incorporate a ferromagnetic delay line, or "waveguide". A pulse generator supplies a current pulse to the delay line which generates a magnetic field which surrounds the delay line. A remote and movable, position indicating magnet is positioned along the delay line. The magnetic field of the position magnet disturbs the magnetic field generated by the current pulse.

The interaction between the permanent magnetic field of the position magnet and the magnetic field induced by the current pulse causes a strain or mechanical reaction within the delay line. This strain induced reaction force within the delay line, is propagated along the length of the delay line as a delayed acoustic torsional wave.

A device, called a mode converter, is typically attached to one end of the waveguide. This element responds to the passage of the torsional acoustic wave and converts it into a representative electrical signal.

The time delay period from the excitation of the waveguide to the reception of the corresponding acoustic wave at the mode converter indicates the position or location of the position magnet along the length of the delay line.

A variety of time measurement, or intervalometer techniques have been used to convert the time period information into a position indicating signal.

For example, U.S. Pat. No. 3,898,555 to J. Tellerman, uses a fixed frequency oscillator to excite the delay line. The returned acoustic signal, in conjunction with the fixed frequency oscillator, develops a signal which is "pulse width modulated" by the position of the magnet along the delay line. An integrator converts the pulse width modulated waveform to a dc voltage level which forms the transducer output.

U.S. Pat. No. 4,721,902 to J. Tellerman et al. teaches inter alia, a method to convert the "pulse width modulated signal" into a digital value. The patent teaches the use of a conversion counter to collect "counts" from a conversion oscillator during the "on" time of the pulse width modulated signal.

This patent also teaches a method to enhance the detection of the delayed acoustic signal through the use of a time domain filter which sets the duration of an inhibit timer based upon the historical output of the transducer. This time domain filtering technique eliminates the contribution of noise to the output signal, however it limits the rate at which the position indicating magnet can move along the gauge.

Magnetostrictive position sensor devices of this type are used in the measurement and control industry. They find use in machine tools; in robotics; as liquid level indicators, as well as other applications.

To facilitate the use of various types of transducers, produced by a variety of manufacturers, industry has adopted a current mode transducer standard referred to as the "4–20 milliamp transmitter" standard. Under this standard, transducers are supplied as a two terminal device. In use, the two terminal transducer device is coupled to a power supply (24 volts, D.C.) and the amount of current drawn by the transducer from the power supply indicates the measured value of the transduced signal. For example, a pressure sensor may draw 4 ma of current from the remote power supply at the minimum pressure, and 20 ma at the maximum pressure, while intermediate pressures would correspond to intermediate current draws.

The magnetostrictive measurement technique requires the reliable detection of the delayed acoustic pulse. These acoustic pulses are attenuated during the course of transmission in the waveguide. In general, the amplitude of the acoustic pulses are the greatest when position indicating magnet is closest to the mode converter; the acoustic pulses are faintest when the magnet is remote from the mode converter.

In the prior art, the maximum length of a magnetostrictive gauge was limited by the detectabilty, in the presence of noise, of the delayed acoustic pulse.

SUMMARY OF THE INVENTION

In contrast to prior art magnetostrictive measurement systems, the present invention includes an automatic threshold circuit which sets the detection threshold for the delayed acoustic pulse as a function of location of the position indicating magnet.

An understanding of the invention and the best mode for practicing it, requires some familiarity with the overall architecture of the illustrative transducer described herein.

The elements of the transducer, include a low frequency, sampling clock which excites the delay line at a relatively low, fixed rate. This pulse generator circuitry generates high current interrogation pulses, but has a low average current draw.

The elements also include, a time measurement system which converts the acoustic delay time to a digital value through the operation of a conversion clock and a conversion counter. A fixed time interval blanking timer initiates the time interval measurement. The reception of a delayed acoustic pulse aids the time interval measurement. The digital value of the measurement is then reconverted to an analog signal.

The elements also include circuitry to convert the averaged measurement to a current draw for the transducer which encodes the position signal onto the power supply leads.

The elements also include a resolution enhancement system where the resolution of time measurement value is enhanced by averaging the analog signal over a time interval which reflects several position measurements.

The enhanced analog position signal as developed by the low pass averaging filter corresponds to the location of the position magnet. This signal is used to control the magnitude of mode converter output required to trip a comparator which indicates the reception of a returned acoustic pulse. In this fashion, the position of the magnet, is used to set the detection threshold of the system. Automatic feedback control of the threshold requirements of a returned signal compensate for the position of the magnet and improve detectability of the acoustic pulses on the waveguide.

BRIEF DESCRIPTION OF THE DRAWINGS

In the drawing, like reference numerals indicate corresponding structures throughout the several views in which.

DETAILED DESCRIPTION OF THE PREFERRED EMBODIMENT

In the following description, reference is made to an illustrative embodiment for carrying out the invention. It is understood that other embodiments may be utilized without departing from the scope of the invention.

OVERVIEW

Figure 1:
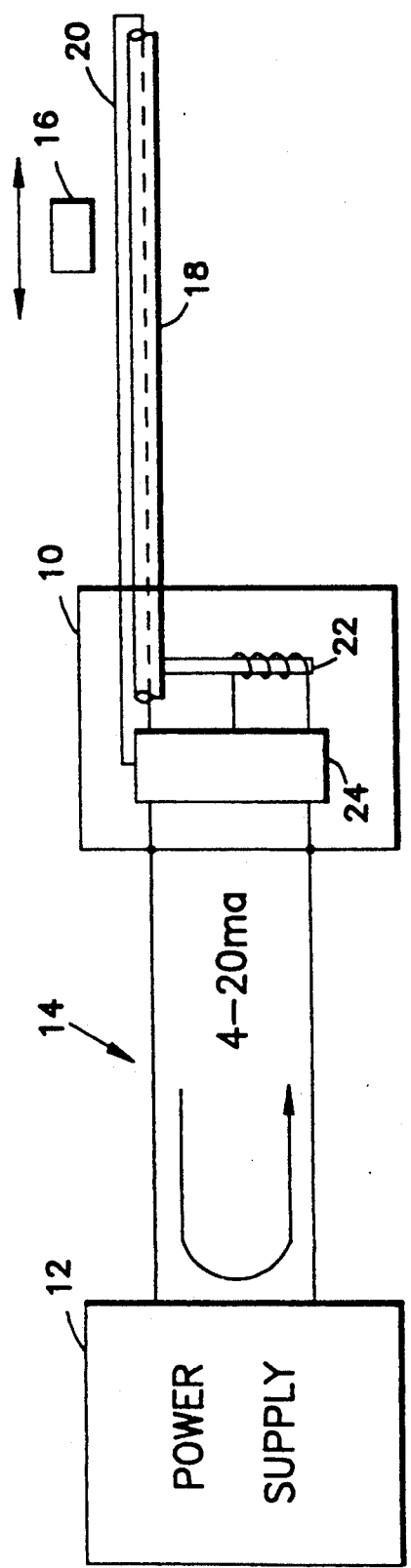
FIG. 1 is a block diagram depicting the interconnection between the transducer and the power supply.

As shown in FIG. 1 the magnetostrictive transducer 10 is connected to a remote power supply 12 through a two conductor current loop 14. The position of the magnet 16 along the gauge length of the delay line 18 is reflected by the current which the transducer 10 draws from the power supply 12. In general, the magnitude of this draw will vary between 4 and 20 milliamps depending on the position of the moveable position indicating magnet 16.

The delay line may comprise a ferromagnetic tube 18 with a coaxial return conductor as shown, or the delay line may be a solid ferromagnetic rod, either round or rectangular in cross-section with a parallel return conductor.

The electronic module 24 contains the control logic and signal processing circuitry. A low frequency sampling clock is provided which triggers a short 1 microsecond, 20 volt pulse which is supplied to the delay line. The induced magnetic field associated with this pulse interacts with the magnetic field of the position magnet 16 which results in a mechanical reaction within the tube 18 at the location of the magnet 16. This interaction generates an acoustic pulse which propagates along the tube and is detected by a mole converter 22.

The mode converter may take many forms, however a common configuration involves a tape armature coupled to the periphery of tube 18, which moves within a coil of wire when the sonic pulse passes the location of the converter. The translational motion imparted to the armature by impulse rotation of the tube gives rise to an electrical signal within the coil which is supplied to the electronic module 24.

Since the speed of propagation in the tube is fixed, one can determine the location of the acoustic wave source by measuring the time required to receive the delayed acoustic pulse. In operation, the time interval between the excitation pulse, initiated by the sampling clock, and the reception of the delayed acoustic pulse returned from the permanent magnet, indicates the distance from the mode converter 22 to the magnet 16.

This propagation time interval is measured, averaged and converted into a current for transmission along the power supply lines.

The digital time measurement process is accomplished by accumulating counts in a conversion counter during a time period or conversion window defined by control logic.

The control logic includes a "blanking" timer converter 22, which occurs as a direct result of excitation which operates to exclude the spurious output of the mode the delay line 18. In the preferred and illustrative circuit shown, the conclusion of the blanking interval, defines the starting point of the conversion window.

As previously mentioned, the delayed signal, returned by the waveguide is used to end the time interval measurement process. This returned acoustic signal has an amplitude dependant upon the distance that the pulse has travelled in the waveguide.

In the present invention, the "effective gain" of the acoustic pulse reception circuitry is varied as a function of the position of the magnet on the gauge, since the amplitude of the acoustic pulse is dependent on the position of the magnet. This result is achieved by altering the amount of mode converter signal required to trip a comparator which generates the signal which corresponds to the detection of an acoustic pulse. In this fashion, the location of the magnet along the length of the gauge sets the threshold for detection of the delayed acoustic pulse.

SYSTEM TIMING

Figure 2:
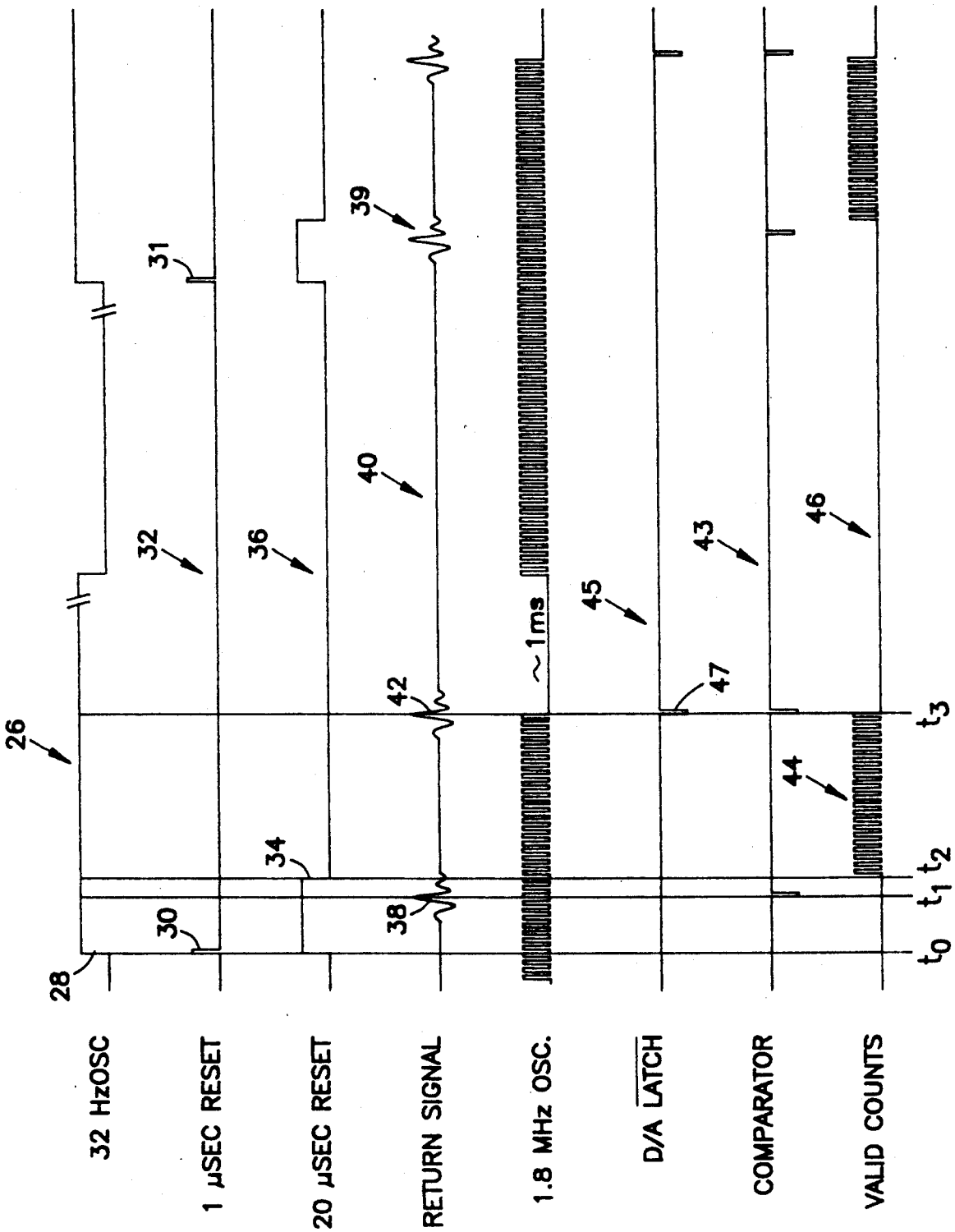
FIG. 2 is a timing diagram depicting the relationship between signals generated during the course of making a position measurement.

FIG. 2 is a timing diagram depicting the relationship between control logic waveforms and signal conversion waveforms generated during the course of a position measurement.

The waveform 26 reflects the output of the low frequency sampling clock as taken from the output pin 60 of the comparator forming a portion of the sampling clock 52. In a preferred embodiment, position measurements are taken at a rate of 32 samples per second. The rising edge 28 of the sampling clock defines time, t0 and initiates the delivery of an excitation pulse to the delay line waveguide 18 as indicated by pulse 30 on waveform 32.

Waveform 32 is taken from the output pin of the pulse forming one shot 54. This signal is the triggering pulse for the power amplifier 56.

The waveform 40 presents the output of the mode converter 22. In general, the mode converter output is amplified by a high gain amplifier 60. The amplified output, is compared to a threshold value in a comparator 62. The logic level output of comparator 62 is depicted on waveform 43.

Waveform 40 corresponds to the mode converter 22 output. Signal complex 38 and signal complex 39, are generated by the delivery of the excitation or interrogation pulses 30 and 31. These events are excluded by the blanking timer 58. Coincident with the generation of the excitation pulse is the initiation of a blanking pulse to exclude the mode convverter output pulse which results directly from the excitation of the delay line. This blanking pulse 34 shown on waveform 36 is fixed and extends for approximately 20 microseconds from t0 to t2 on FIG. 2. This blanking pulse 34 is used to blank out mode converter pulse 38 shown on waveform 40, by gating out (through NOR 171) the mode converter comparator output. Also, the blanking time resets the conversion counter 66 after the pulse 38 has occurred, enabling the counting process, at the conclusion of the blanking time.

In this fashion, the system is configured to receive the delayed, position indicating acoustic pulse 42, shown on waveform 40. The duration of the measured time period (t2 to t3) corresponds to the travel time for the acoustic pulse along the wave guide 18. During this time period (t2 to t3), a high frequency conversion oscillator 64 supplies "counts" to the conversion counter 66. The counts collected are shown as 44 on wave form 46. This time interval is referred to as the conversion window.

The end of the conversion window corresponds to the latch output pulse to the digital to analog converter 68.

It should be appreciated that the conversion clock toggles at a relatively high 1.8MHz rate and draws substantial current from the supply. It is preferred to turn the clock off with the acoustic return pulse 42 which activates the digital to analog conversion latch as shown at 47 on waveform 45. It is preferred to turn the conversion clock on with the RC timer formed by resistor 71 and capacitor 72. The time constant of this network is short enough to permit conversion clock turn on well in advance of the measurement cycle insuring frequency stability. Operating the oscillator in this fashion eliminates the need for a separate high current draw gate to control the oscillator.

Figure 3:
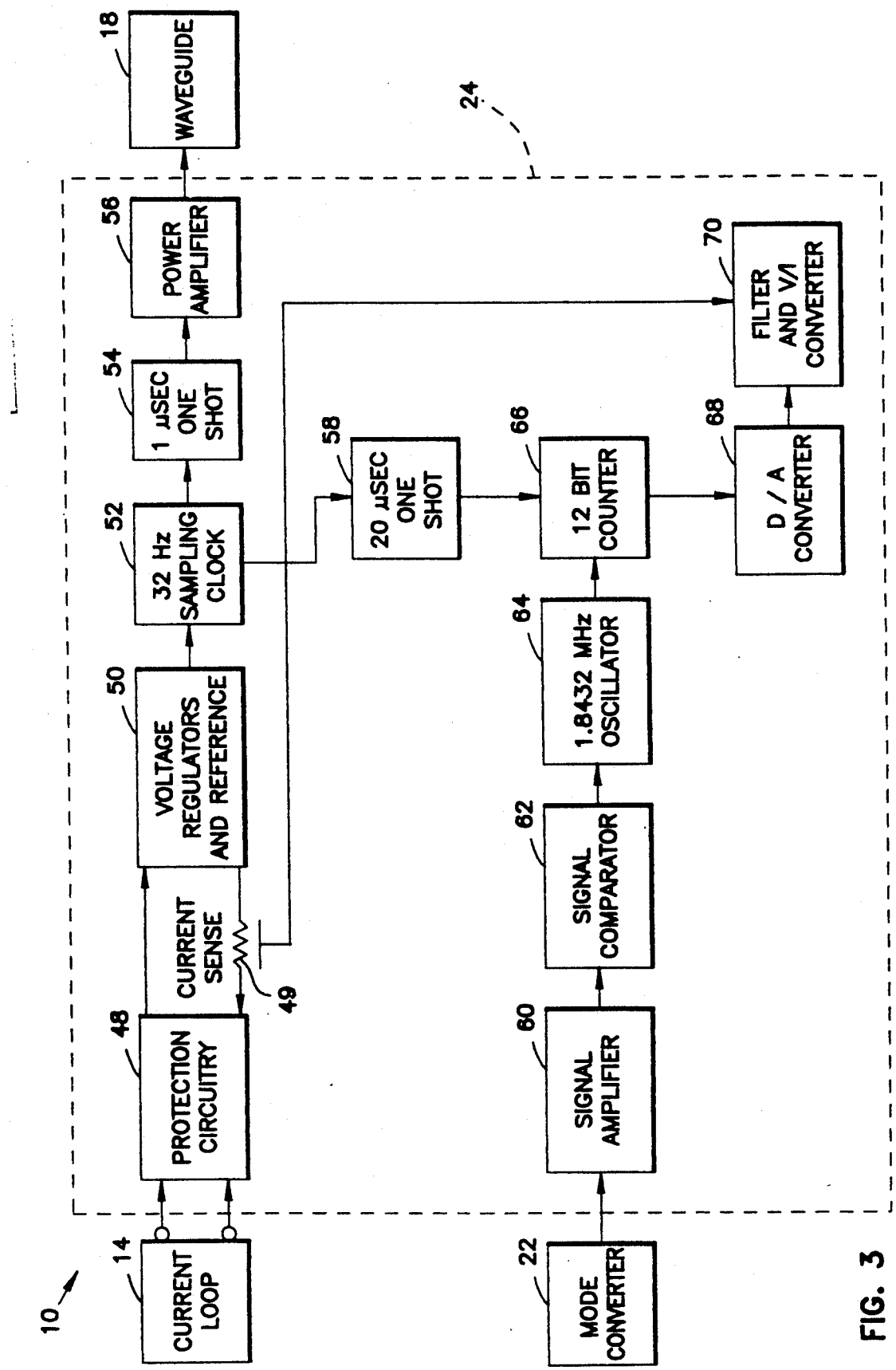
FIG. 3 is a block diagram partitioning the electrical schematic to facilitate discussion of the functional relationships between control logic, and analog signal processing elements and structures of the magnetostrictive transducer system.

FIG. 3 is a block diagram partitioning the electrical schematic to facilitate discussion of the functional relationships between elements and structures of the magnetostrictive transducer system.

The current loop 14 is interfaced with the transducer system 10 through protection circuitry 48. This circuitry serves to shunt over voltages and to protect against over current conditions due to polarity reversal. A current source and several voltage regulators 50 supply the operating voltages to the remaining circuitry.

The sampling clock 52 output serves to initiate the excitation pulse delivered to the waveguide 18 through the power amplifier 56 and triggering one shot 54. The sampling clock 52 also initiates the blanking one shot 58.

The acoustic pulse transduced by the mode converter 22 is amplified in amplifier 60. After suitable amplification the amplitude of the returned signal is compared with a threshold value in comparator 62.

In general, the output of the mode converter is amplified by a high gain amplifier stage 60 which generates an output signal which varies in amplitude (in the absence of noise) as the magnet is moved along the gauge. The output of the is amplifier is AC coupled to the comparator. If the AC excursion of the mode converter signal exceeds the threshold of the comparator, a logic detect signal is generated. This signal indicates the reception of a returned pulse, and turns off the conversion oscillator 64, ending the digital time conversion process.

Once the digital value of the time interval is latched in the conversion counter 66, the digital value is converted to an analog voltage level in digital to analog converter 68. Several sequential time interval measurements are converted to an average current value through the operation of the filter and the voltage to current converter 70. The output of the voltage to current conversion is used to modulate the current drawn by the transducer system 10 from the supply 14 through the current sense resistor 49.

FIG. 4 is a schematic diagram of an illustrative circuit for carrying out the invention. Component types and values are set forth as follows:

| RESISTORS | | CAPACITORS | |
|---|---|---|---|
| 20Ω | 49,134 | 47 pf | 72 |
| 1MΩ | 71 | 10 μf | 82,83,153 |
| 2KΩ | 84 | 560 pf | 135 |
| 2.2Ω | 86,87,104,105,106 | 1 μf | 136,139,140,152 |
| 150kΩ | 90 | 100 pf | 137,144,147,151 |
| 10MΩ | 91 | .01 μf | 138 |
| 10Ω | 92,108,116,129,132,133 | 0.1 μf | 141,142,143, |
| 100kΩ | 93,99,101,110 | | 145,146,148, |
| 10MΩ | 94 | | 150,156 |
| 80.6KΩ | 95 | .033 μf | 154 |
| 121kΩ | 102 | 3.3 μf | 155 |
| 732Ω | 96 | | |
| 31.6kΩ | 97 | | |
| 470kΩ | 100,111 | | |
| 162kΩ | 98 | | |
| 15kΩ | 103 | | |
| 1kΩ | 107,113,114 | | |
| 10kΩ | 117,123,126,131 | | |
| 49.9kΩ | 112,120,121,122,128 | | |
| 24.9kΩ | 115,125 | | |
| 787Ω | 118 | | |
| 60.4kΩ | 119 | | |
| 100kΩ | 127 | | |
| 4.99kΩ | 124,130 | | |

Figure 4A:
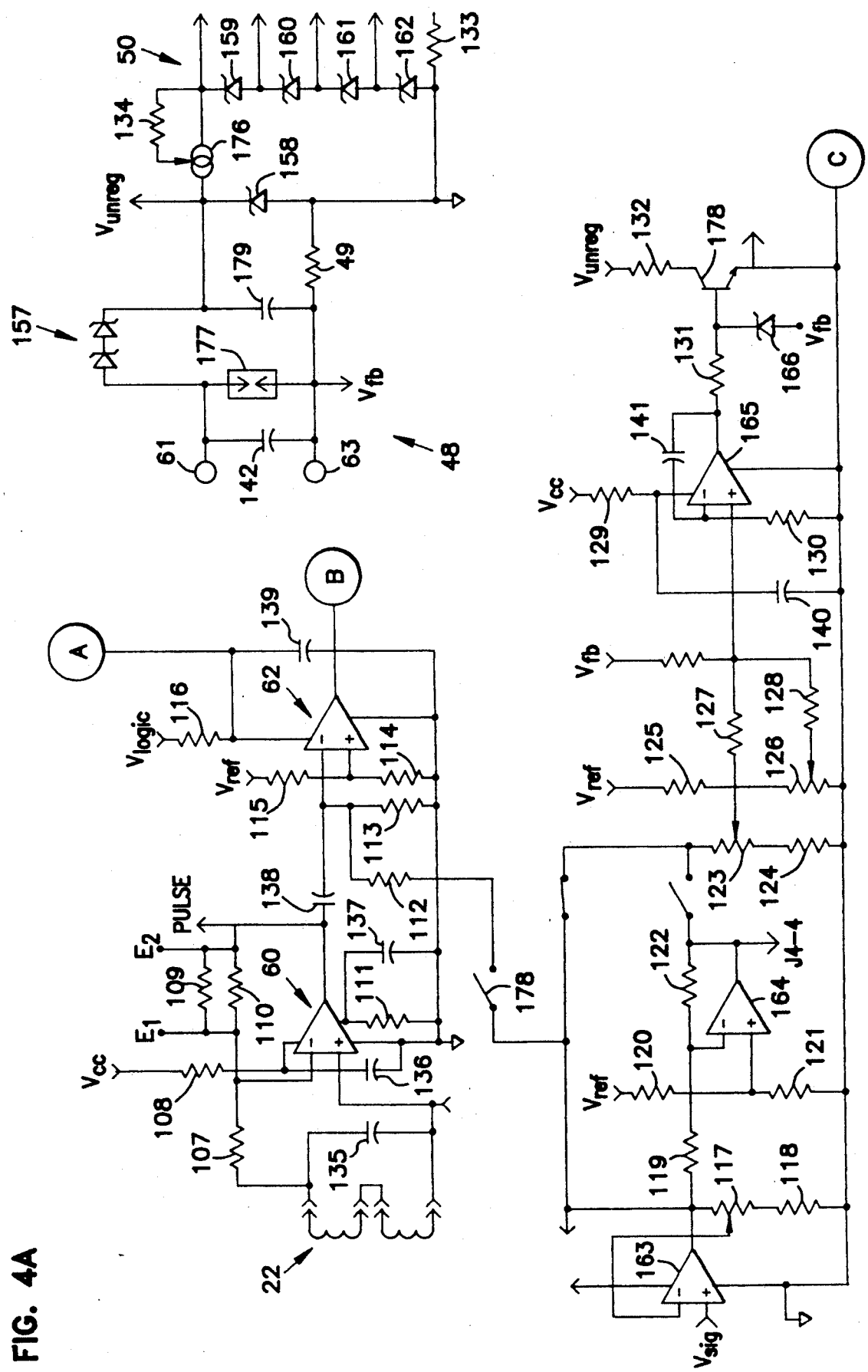
FIG. 4 is a schematic diagram of an illustrative circuit for carrying out the invention. The figure is divided into two portions with interconnection points depicted in circles.

Turning to FIG. 4A, the transducer circuitry is connected to the remote power supply through terminals 61 and 63. Protection circuitry includes diode 157 and the spark gap 177. The capacitor 142 prevents noise from entering the system. The current source 176 and the voltage regulators 159,160,161, and 162 form the internal power supply for the remaining circuitry.

Figure 4B:
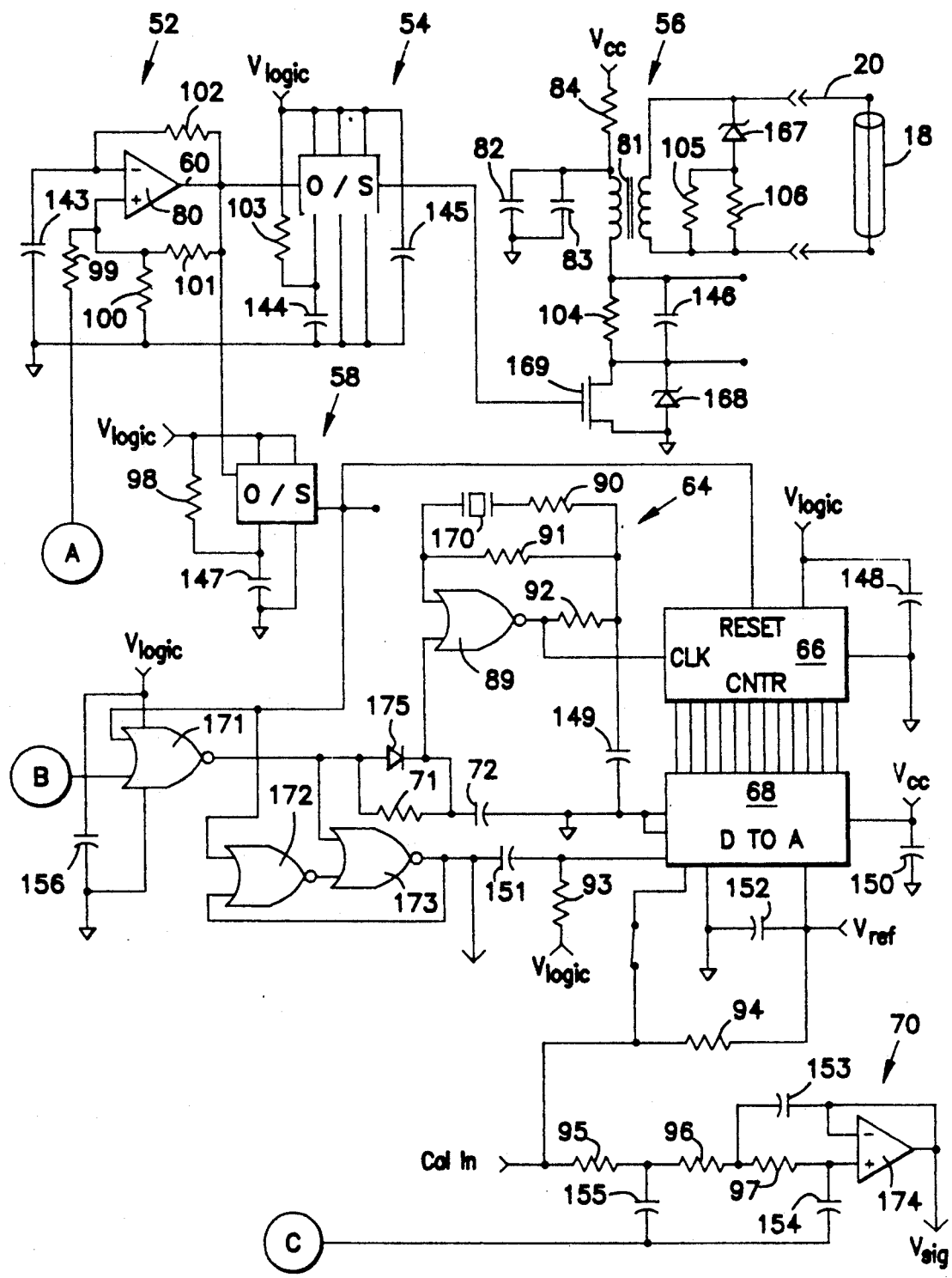

The sampling clock 52, on FIG. 4b may be implemented with an RC oscillator formed about comparator 80. The sampling clock 52 triggers the edge triggered one shot 54. The oneshot generates the narrow trigger pulse used to excite the waveguide or delay line 18. It is preferred to use a step up transformer 81 in conjunction with capacitor discharge circuitry to generate the relatively high energy pulse required to excite the delay line. In operation, the capacitors 82 and 83 are charged slowly through resistor 84, to minimize instantaneous current draw. Upon receipt of a triggering pulse from the one shot 54, the FET 169 conducts the charge to common energizing the primary winding of transformer 81. Pulse shaping circuitry including resistors 105 and 106 cooperate with the Schottky diode 167 to form a rapid rise time pulse to drive the magnetostrictive delay line 18.

The sampling clock 52 also initiates the blanking circuitry implemented as a 20 microsecond oneshot 58. The blanking circuit has two related functions. The output from the one shot, operates through logic gate 171 to blank out the output while the caparator comparator out oneshot is high, thus preventing false detection of the comparator output resulting directly from excitation of the waveguide 18. Another function of the oneshot 58 is to initiate the count conversion process by removing the reset on the counter to permit counting, as depicted in FIG. 2 on waveform 46.

On FIG. 4A, the mode converter coils 22 are coupled to the input of a high gain amplifier shown on the figure as 60 and associated components. The gain of this amplification stage generates an approximately 75 millivolt signal. The amplifier output is compared with a reference voltage in comparator 62. For a typical gauge it is preferred to allow the comparator to toggle on signals, which exceed a fixed 50 millivolts amplitude threshold set by the resistive voltage divider formed by resistor 115 and 114.

In operation, the amplitude of the AC component of the amplified mode converter signal is supplied to the signal input of the comparator 62. If the magnitude of this applied signal exceeds the reference level set by the resistive divider then the comparator will toggle generating a logic level output indicating the reception of an acoustic pulse.

However, when the switch 178 is closed an additional controlled reference DC voltage is summed at the signal input of the comparator. In this instance, the AC component required to trip the comparator is reduced by the amount of DC bias supplied through the switch 178 to the comparator.

As described in more detail elsewhere, the voltage at the switch 178 represents the time averaged position measurement developed from the output of the filter 70. Consequently the value of DC supplied to the node of the comparator reflects the measured position of the magnet. In this preferred mode the voltage at the switch is time averaged, however the principle motivation for the time averaging is resolution enhancement and the use of an instantaneous value for magnet position is both operable and desirable in some applications.

The logic level output of the comparator 62 turns off the conversion clock 64 formed by the NOR gate 89 and associated crystal oscillator components.

Once valid counts are collected by the counter 66, the digital to analog converter 68 converts the number to a and used to current corresponding analog value. This analog valve is averaged, system 10. The resolution of the transducer is enhanced by averaging many analog voltage readings. In general, a digital counter cannot resolve beyond the least significant digit because of the quantizing error of plus or minus one bit. Consequently, the resolution of a twelve bit counter is normally limited to 1 out of 4096 bits or 0.024%. However, if the quantizing error is random then a large number of sequential measurements would statistically favor one bit state for the least significant bit of the counter. Therefore by averaging the analog output of the digital to analog converter the resolution is improved beyond the normal capacity of the counter. In the preferred embodiment a sampling rate of 32 Hertz is preferred and a one half second time constant, low pass, three pole, active filter 70 is provided to average the output voltage over sixteen measurements. This procedure generates a square root of 16 or 4 times improvement of the underlying resolution, resulting in an effective resolution of 0.006%.

Op amp 164 and the associated switches allow the gauge starting point to be adjusted. In some applications it is desirable to have the "4ma" draw at one end of the gage. This circuitry permits selecting the end of the desirable to permit the effective gauge to length to be adjusted. The variable resistor 123 sets this span value while the variable resistor 126 is used to zero the gauge.

The op amp 165 forms part of the "current draw" circuitry. In operation, the op amp and the transistor 178 sink current from the remote power supply to indicate the magnitude of the Vsig signal. Feed back from the actual current required to operate the circuitry of the transducer is measured across the current sense resistor 49.

In summary, the sampling clock 52 triggers the interrogation pulse supplied to the waveguide and also starts the blanking timer 58. The blanking timer removes the reset condition on the conversion counter 68 at the conclusion of a fixed blanking time. The mode converter output which results directly from the excitation of the waveguide occurs during this blanking interval and is effectively ignored since the conversion counter is reset during the blanking interval. The next, mode converter output pulse, is the delayed output pulse and this signal is used to turn the conversion clock off. The digital number developed in the counter during this counting window is converted to an analog value and low pass filtered to enhance the resolution of the gauge. The averaged signal is then used to control the current draw of the gauge from a remote supply, and is used to control the amplitude of mode converter signal required to terminate the measurement time interval window.

I claim:
1. A magnetostrictive transducer comprising:
   a ferromagnetic delay line;
   a pulse generator for generating interrogation pulses in said delay line;
   position magnet means located proximate said ferromagnetic delay line for converting said interrogation pulses into acoustic pulses at the location of said magnet means;
   a mode converter coupled to said ferromagnetic delay line for converting said acoustic pulses into corresponding representative electrical pulses,
   detector means coupled to said mode converter for converting one of said representative electrical pulses into a corresponding detection pulse whenever one of said representative electrical pulses exceeds a variable threshold level;
   variable threshold level means coupled to said detector means and coupled to a position determination means for setting a variable threshold level as a function of a position measurement;
   said position determination means coupled to said pulse generator and too said detector means for generating a position measurement indicating the position of said magnet means by determining the time elapsed from the generation of said interrogation pulse to the reception of a corresponding acoustic pulse at said mode converter.

2. The magnetostrictive transducer apparatus of claim 1 wherein said variable threshold level mans further comprises:
   averaging means coupled to said position determination means for generating a time averaged value of said position measurement for delivery to said variable threshold means.

3. The magnetostrictive transducer apparatus of claim 1 wherein said detector means comprises:
   amplifier means coupled to said mode converter means for amplifying said corresponding representative electrical pulses;
   comparator means coupled to said amplifier means for comparing the amplified output of said amplifying means to said threshold level, and for generating a detection pulse when said amplified output exceeds said threshold level.

4. The magnetostrictive transducer apparatus of claim 1 wherein said detector means comprises:
   amplifier means coupled to said mode converter means for amplifying said corresponding representative electrical pulses, and for producing an amplified output;
   comparator means coupled to said amplifier means for comparing the AC component, of said amplified output of said amplifying means to a DC threshold level, and for generating a detection pulse when said amplified AC component exceeds said DC threshold level.

5. The magnetostrictive transducer apparatus of claim 4 wherein said variable threshold means comprises:
   conversion means, coupled to said comparator means, and coupled to said position determination means, for generating a DC voltage representative of the time averaged value of said position measurement signal,
   whereby, the comparator threshold varies as a function of said magnet position.

* * * * *

UNITED STATES PATENT AND TRADEMARK OFFICE
CERTIFICATE OF CORRECTION

PATENT NO. : 5,043,685

DATED : August 27, 1991

INVENTOR(S) : David S. Nyce

It is certified that error appears in the above-identified patent and that said Letters Patent is hereby corrected as shown below:

Col. 2, line 13, "D.C.)" should read --DC)--.

Col. 3, line 58, "mole" should read --mode--.

Col. 4, line 14, insert --which operates to exclude the spurious output of the mode-- after the word "timer".

Col. 4, lines 16-17, delete "which operates to exclude the spurious output of the mode" after the word "excitation".

Col. 4, line 17, insert --of-- after the word "excitation".

Col. 5, line 57, delete "is" after the word "the".

Col. 6, lines 62-63, "to blank out the output while the caparator comparator out oneshot is high," should read --to blank out the output of the oneshot comparator while the oneshot comparator out, is high,--.

Col. 7, line 39, delete "and used to current" after the word "a".

Col. 7, line 40, "valve" should read --value--.

Col. 7, line 40, insert --and used to control the current draw of the transducer-- after the word "averaged".

Col. 7, line 63, "gage" should read --gauge--.

Col. 7, line 63, insert --gauge which corresponds to the "4ma" setting. It is also-- after the word "the" (second occurrence).

Col. 7, line 64, delete "to" after the rod "gauge".

UNITED STATES PATENT AND TRADEMARK OFFICE
CERTIFICATE OF CORRECTION

PATENT NO. : 5,043,685

DATED : August 27, 1991

INVENTOR(S) : David S. Nyce

It is certified that error appears in the above-identified patent and that said Letters Patent is hereby corrected as shown below:

Col. 8, line 9, "68" should read --66--.

Col. 8, line 55, Claim 2, "mans" should read --means--.

Signed and Sealed this

Sixteenth Day of March, 1993

Attest:

STEPHEN G. KUNIN

*Attesting Officer*      *Acting Commissioner of Patents and Trademarks*